United States Patent [19]
Suzuki et al.

[11] Patent Number: 4,591,633
[45] Date of Patent: May 27, 1986

[54] DEODORIZED POLYOLEFINS AND PROCESS FOR THE PREPARATION THEREOF

[75] Inventors: Takeshi Suzuki; Nobutoshi Komori, both of Chibaken, Japan

[73] Assignee: Chisso Corporation, Osaka, Japan

[21] Appl. No.: 752,653

[22] Filed: Jul. 8, 1985

Related U.S. Application Data

[63] Continuation of Ser. No. 450,426, Dec. 16, 1982, abandoned.

[51] Int. Cl.$^4$ ............................................. C08F 6/08
[52] U.S. Cl. ................................. 528/485; 524/424; 524/445; 524/450; 528/488
[58] Field of Search ............... 524/424, 445, 450; 528/485, 488

[56] References Cited

U.S. PATENT DOCUMENTS

| | | | |
|---|---|---|---|
| 4,284,762 | 8/1981 | Miyata | 528/485 |
| 4,371,656 | 2/1983 | Kashiwase | 524/443 |
| 4,379,882 | 4/1983 | Miyata | 524/436 |

*Primary Examiner*—Paul R. Michl
*Attorney, Agent, or Firm*—Fred Philpitt

[57] ABSTRACT

Purified polyolefins prepared by deactivating Ziegler type catalyst residue contained in polyolefins not purified by use of alkylene oxide and having off-odor are mixed for deodorization with 0.001 to 0.5% by weight of at least one deodorizer selected from the compounds having the following formulas (1) to (6):

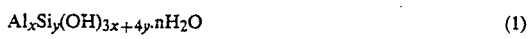

(1)

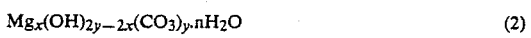

(2)

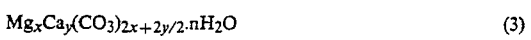

(3)

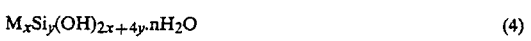

(4)

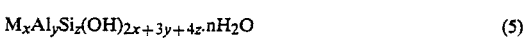

(5)

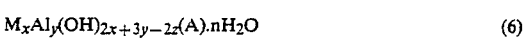

(6)

where M represents Mg or Ca; A represents $CO_3$, $HPO_4$ or $SO_4$; x, y and z represent a positive number; and n represents zero or a positive integer; calcined products therefrom, and hydrates thereof. The deodorizer may be added thereto independently from or concurrently with other additives to be mixed.

Another aspect of the present invention is directed to a process for the preparation of deodorized polyolefins which comprises mixing polyolefins purified by deactivating the catalyst residue remained in crude polyolefins obtained by the polymerization of olefins by use of Ziegler type catalyst at least one deodorizer said above.

8 Claims, No Drawings

DEODORIZED POLYOLEFINS AND PROCESS FOR THE PREPARATION THEREOF

This is a continuation of application Ser. No. 450,426, filed 12-16-1982 abandoned and the benefits of 35 USC 120 are claimed relative to it.

BACKGROUND OF THE INVENTION

(1) Field of the Invention

This invention relates to deodorized polyolefins and a process for the preparation thereof, and more particularly relates to purified polyolefins prepared by deodorizing Ziegler process polyolefins having off-odor caused by a catalyst deactivating agent present in the Ziegler process polyolefins, and to a process for the preparation of the purified olefins.

(2) Description of the Prior Art

Recent proposals of the so-called high activity catalyst in the process for the preparation of polyolefins by use of Ziegler catalyst have resulted in remarkably simplifying the aforesaid process. Examples of omitted steps in the aforesaid simplified process compared with the classic preparation process include an amorphous polyolefin separation step, a solvent recovery step in the case of a gaseous phase process, a deashing step, and the like. However, even in the case where the deashing step can be omitted, crude polyolefins resulting immediately after polymerization must be subjected to a purifying step or a catalyst deactivating step prior to being passed, to the following step, because a catalyst residue contained in the crude polyolefins has some catalytic activity remaining therein. Examples of the deactivating agent, which reacts with the catalyst for the deactivation thereof, include water, alcohols, alkylene oxide, and the like. Of these deactivating agents, alkylene oxide is widely used as the deactivating agent due to easiness in handling and to high deactivation effect. However, polyolefins purified by use of alkylene oxide (hereinafter referred to as polyolefins purified with alkylene oxide) have such disadvantages that products molded from polyolefins purified with alkylene oxide such as molded parts, films, fibers and other workpieces have a peculiar off-odor, which reduces commercial values of the molded products as above and is liable to make the molded poriducts impossible to be used for some applications.

However, the fact that polyolefins purified with alkylene oxide have disadvantages as above is not publicly known prior to the filing of this patent application, but has newly been found as the result of studying dependence of effect on cause between the peculiar off-odor of molded products and the deactivating agent.

With an aim of neutralizing trace amounts of acid substances in the catalyst residue contained in the polyolefins not purified, for example, Japanese patent laid-open publication No. 3947/1974 discloses a process in which calcium hydroxide or magnesium hydroxide is mixed therewith, and Japanese patent laid-open publication Nos. 49285/1977 and 80447/1980 disclose a process in which hydrotalcite is mixed therewith. However, the aforesaid processes are unsatisfactory to solve the problems of deodorization described as above.

SUMMARY OF THE INVENTION

An object of the present invention is to provide polyolefins purified with alkylene oxide as the deactivating agent, deodorized and free of off-odor when molded therefrom, and a process for the preparation thereof.

Another object of the present invention is to provide deodorized molded products from deodorized polyolefins.

Other object of the present invention is to provide a process for the preparation of polyolefins, in which application of alkylene oxide as the deactivating agent in the purifying step is made easier.

An aspect of the present invention is directed to polyolefins deodorized by mixing polyolefins purified by deactivating the catalyst residue remained in crude polyolefins obtained by the polymerization of olefins by use of Ziegler type catalyst with 0.001 to 0.5% by weight of at least one deodorizers selected from the compounds having the following formulas (1) to (6):

$$Al_xSi_y(OH)_{3x+4y} \cdot nH_2O \quad (1)$$

$$Mg_x(OH)_{2y-2x}(CO_3)_y \cdot nH_2O \quad (2)$$

$$Mg_xCa_y(CO_3)_{2x+2y/2} \cdot nH_2O \quad (3)$$

$$M_xSi_y(OH)_{2x+4y} \cdot nH_2O \quad (4)$$

$$M_xAl_ySi_z(OH)_{2x+3y+4z} \cdot nH_2O \quad (5)$$

$$M_xAl_y(OH)_{2x+3y-2z}(A) \cdot nH_2O \quad (6)$$

where M represents Mg or Ca; A represents $CO_3$, $HOP_4$ or $SO_4$; x, y and z represent a positive number; and n represents zero or a positive integer; calcined products therefrom, and hydrates thereof.

Another aspect of the present invention is directed to a process for the preparation of deodorized polyolefins which comprises mixing polyolefins purified by deactivating the catalyst residue remained in crude polyolefins obtained by the polymerization of olefins by use of Ziegler type catalyst with 0.001 to 0.5% by weight of at least one deodorizers selected from the compounds having the following formulas (1) to (6):

$$Al_xSi_y(OH)_{3x+4y} \cdot nH_2O \quad (1)$$

$$Mg_x(OH)_{2y-2x}(CO_3)_y \cdot nH_2O \quad (2)$$

$$Mg_xCa_y(CO_3)_{2x+2y/2} \cdot nH_2O \quad (3)$$

$$M_xSi_y(OH)_{2x+4y} \cdot nH_2O \quad (4)$$

$$M_xAl_ySi_z(OH)_{2x+3y+4z} \cdot nH_2O \quad (5)$$

$$M_xAl_y(OH)_{2x+3y-2z}(A) \cdot nH_2O \quad (6)$$

where M represents Mg or Ca; A represents $CO_3$, $HPO_4$ or $SO_4$; x, y and z represent a positive number; and n represents zero or a positive integer; calcined products therefrom, and hydrates thereof.

DETAILED DESCRIPTION OF THE PREFERRED EMBODIMENTS

Olefins used in the present invention include those substantially used as the starting material for the preparation of polyolefins. Examples of the olefins used in the present invention include mono-α-olefins such as ethylene, propylene, butene-1, 4-methyl pentene-1 and hexene-1, cyclic vinyl compounds such as stylene and vinyl cyclohexane, diolefins such as butadiene, and the like.

Ziegler type catalyst used in the present invention is typically known as a combination of organometallic compounds of the metals of Groups I to III of the Periodic Table with transition metal compounds (including those having less valency than the maximum valency) or as improvements thereof. Furthermore, Ziegler type catalyst includes those having various third ingredients or with transition metal compound supported on a carrier for the purpose of improving catalyst performance, and those with which α-olefins are prepolymerized, to enhance invention is mixed with a predetermined amount of a deodorizer selected from inorganic double salts with water of crystallization as represented by the formulas (1) to (6):

$$Al_xSi_y(OH)_{3x+4y} \cdot nH_2O \quad (1)$$

$$Mg_x(OH)_{2y-2x}(CO_3)_y \cdot nH_2O \quad (2)$$

$$Mg_xCa_y(CO_3)_{2x+2y/2} \cdot nH_2O \quad (3)$$

$$M_xSi_y(OH)_{2x+4y} \cdot nH_2O \quad (4)$$

$$M_xAl_ySi_z(OH)_{2x+3y+4z} \cdot nH_2O \quad (5)$$

$$M_xAl_y(OH)_{2x+3y-2z}(A) \cdot nH_2O \quad (6)$$

where M represents Mg or Ca, A represents $CO_3$, $HPO_4$ or $SO_4$; x, y and z represent a positive number, and n represents zero or a positive number; calcined products thereof; and hydrates thereof.

The calcined product as above is obtained by heating the double salts to remove partly or completely moisture or water of crystallization contained therein for dehydration. The inorganic double salts represented by the formulas (1) to (6) as above, calcined products thereof, or hydrates thereof (hereinafter may be referred to as inorganic salts, etc. of the present invention) have a mean particle size less than 10 μm, preferably 0.01 to 1 μm. The inorganic double salts, etc. having a particle size less than 0.01 μm may be used so long as uniform mixing can be performed. The specific surface of particles of the inorganic double salts, etc. used in the present invention is not specifically limited, the greater the better, preferably 10 to 300 m²/g. The inorganic double salts, etc. of the present invention are mixed with the polyolefins purified as above in an amount of from 0.001 to 0.5% by weight, preferably 0.005 to 0.1% by weight thereof based on the weight of the polyolefins purified as above. As apparent from the percentage of the amount of the inorganic double salts, etc. to be mixed, the amount of the inorganic double salts, etc. to be mixed is substantially much less than those of other additives such as heat stabilizers. To be surprised, addition of such an extremely small amount of the inorganic double salts, etc. makes possible to sufficiently deodorize the purified polyolefins having off-odor, which is remarkably increased for molded products. The mixing method of the inorganic double salts, etc. of the present invention with the purified polyolefins, etc. is not specifically limited, so long as uniform mixing is performed in spite of such a small amount of the inorganic double salts, etc. to be mixed.

The inorganic double salts, etc. may be mixed with the purified polyolefin prior to addition of other additives, concurrently with other additives, or after addition of other additives, that is, in the plastisizing step in the pelletization of the purified polyolefin. The inorganic double salts, etc. are added in such a small amount that the inorganic double salts, etc. are preferably mixed beforehand with a small amount of the purified polyolefin powder to obtain a mixed product, which is then mixed with the purified polyolefin. Mixing apparatuses and mixing conditions are not specifically limited, but mixing of the inorganic double salts, etc. with the purified polyolefin is generally conducted by use of a high speed agitation type mixer or Henschell mixer, a trade name, at a temperature of from room temperature to 50° C. for a period of one minute to 30 minutes. Other mixing devices such as a ribbon blender or twin-shell blender may also be used.

The deodorized polyolefin of the present invention is processed to molded parts, films, fibers, and other molded products with little or no peculiar off-odor caused by the alkylene oxide, resulting in releasing any restrictions in application thereof such as non-availability thereof to food containers, and in preventing reduction in commercial values of molded products due to off-odor.

The process of the present invention may be said a much more preferable process for the preparation of deodorized polyolefins compared with other provable deodorizing processes such as a process in which ingredients having off-odor are extracted with solvent from purified polyolefins as above in that the process of the present invention is readily applicable without needing any additional apparatus or any addition method to the conventional process of pelletization from the purified polyolefin as above, and without impairing any addition processes of other additives.

The present invention will be explained more in detail by the following examples and comparative examples.

In the examples and comparative examples, measurements are made as follows:

MFR is measured according to ASTM-D1738.

With respect to ash content in polyolefin, the amounts of Al, Ti and Cl are measured by fluorescent X-ray analysis as shown by XRFCl. The amount of active chlorine is measured in such a manner that a sample of polyolefin is heated to 300° C., to measure an amount of hydrogen chloride in the gas thus generated, and the amount of hydrogen chloride is represented by a proportion thereof to polyolefin. Yellowness Index (YI) is measured by a differential colorimeter (marketed by Suga Tester Co., Ltd.).

The off-odor of the molded product is classified into the following five grades 1, 2, 3, 4 and 5:

1 represents "strongly smelling",
2 represents "considerably smelling",
3 represents "smelling",
4 represents "a little smelling", and
5 represents "non-smelling", according to the results of an organoleptic test of test pieces just removed from the molding machine, which applies to additives (compounds or calcined products thereof) used in the examples and comparative examples as shown in Table-1.

TABLE 1

| Additives | | | | Particle |
|---|---|---|---|---|
| No. | Type* | Names of additives | Formulas of additives | sizes |
| 1 | — | α-alumina | $Al_2O_3$ | $\leq 3\mu$ |
| 2 | — | ultrafine silica | $SiO_2$ | $\leq 0.05\mu$ |

TABLE 1-continued

| Additives | | | | Particle |
|---|---|---|---|---|
| No. | Type* | Names of additives | Formulas of additives | sizes |
| 3 | — | magnesia | MgO | mean 10μ |
| 4 | (4) | talc** | $Mg_3Si_4O_{10}(OH)_2$ | ≦1μ |
| 5 | (1) | aluminium silicate** | $Al_2O_3 \cdot 2SiO_2$ | ≦1μ |
| 6 | (3) | magnesium calcium silicate** | $CaMg(CO_3)_2$ | ≦1μ |
| 7 | (2) | basic magnesium carbonate | $4MgCO_3 \cdot Mg(OH)_2 \cdot 4H_2O$ | ≦1μ |
| 8 | (5) | magnesium aluminosilicate** | $MgO \cdot Al_2O_3 \cdot 2SiO_2$ | ≦1μ |
| 9 | (6) | hydrotalcite | $Mg_4 \cdot Al_2(OH)_2CO_3 \cdot 3H_2O$ | ≦0.5μ |
| 10 | (6) | hydrotalcite** | $Mg_4 \cdot Al_2(OH)_2CO_3$ | ≦0.5μ |
| 11 | (5) | calcium aluminosilicate** | $CaO \cdot Al_2O_3 \cdot 2SiO_2 \cdot 4H_2O$ | 1–5μ |

Note: *(1) to (6) represent the deodorizers used in the present invention.
**calcined products thereof respectively

EXAMPLES 1–8; COMPARATIVE EXAMPLES 1–3

The purified polypropylene used in the present invention is prepared in the following manner. A 860 l horizontal polymerizer fitted with a stirrer, a number of rotation of which is 40 rpm, and having a L/D of 5 is dried and the air therein is replaced by nitrogen gas. Into a polypropylene powder bed in the polymerizer, 17.3 g/Hr of titanium trichloride composition as a catalyst as described in Example 1(1) of Japanese Patent Application No. 12875/1980, 40 g/Hr of diethyl aluminum chloride, propylene as the starting material, and hydrogen as a molecular weight modifier at a gaseous concentration of 2.0 mol % are charged to be subjected to gas phase polymerization for 3 hours at a temperature of 70° C. under a pressure of 20 Kg/cm²G, followed by replacement of nitrogen therein by air and cooling to obtain crude polypropylene having a MFR of 7.0, and containing 34 ppm of Ti, 60 ppm of Al, and 150 ppm of Cl resulting from the catalyst used respectively. The crude polypropylene powder is purified in the following manner. The crude polypropylene charged in a fluidized bed purifying apparatus are fluidized with a fluidizing and purifying gas composed of one mol % of propylene oxide and 99 mol % of nitrogen at 95° C. for 30 minutes to deactivate the catalyst residue contained in the crude polypropylene, resulting in obtaining purified polypropylene.

Procedures of respective examples and comparative examples are carried out by use of the purified polypropylene in the following manner. 10 Kg of the purified polypropylene, 0.01 Kg of 2,6-di-tertiary-butyl-4-methylphenol, 0.01 Kg of calcium stearate and respective additives listed in Table-1 are mixed in a high speed agitation type mixer (Henschel mixer) at room temperature for 10 minutes. The resulting mixture is subjected to pelletization by use of twin granulator at 230° C. The pellets thus obtained are molded by use of an injection molding machine to form a test piece of 150 mm×150 mm×3 mm.

Effects on the YI and grades of smelling of the types and amounts of additives are shown in Table-2.

TABLE 2

| | Additives | | Effects | |
|---|---|---|---|---|
| | No. | Amounts (% by weight) | YI of pellet | Grade of off-odor |
| Example 1 | 9 | 0.01 | 1.5 | 4 |
| Example 2 | 4 | 0.01 | 1.6 | 4 |
| Example 3 | 5 | 0.02 | 1.4 | 4 |
| Example 4 | 6 | 0.03 | 1.3 | 4 |
| Example 5 | 7 | 0.04 | 1.2 | 4 |
| Example 6 | 8 | 0.03 | 1.5 | 4 |
| Example 7 | 9 | 0.05 | 1.6 | 5 |
| Example 8 | 10 | 0.007 | 1.4 | 5 |
| Example 9 | 11 | 0.01 | 1.0 | 5 |
| Comparative Example 1 | none | — | 1.7 | 1 |
| Comparative Example 2 | 1 | 0.01 | 1.7 | 1 |
| Comparative Example 3 | 2 | 0.01 | 2.0 | 2 |

Note: The ash content of each pellet is 12 ppm in terms of XRFCl.

Each pellet has an active chlorine content in the purified polypropylene of zero ppm.

What is claimed is:

1. Deodorized polypropylenes comprising a mixture of
   (a) polypropylenes that have been produced with a Ziegler catalyst and which have had the catalyst deactivated with an alkylene oxide and containing zero active chlorine, and
   (b) 0.005 to 0.1% by weight of at least one deodorizer selected from the compounds having the following formula 1 to 6:

$$Al_xSi_y(OH)_{3x+4y} \cdot nH_2O \quad (1)$$

$$Mg_x(OH)_{2y-2x}(CO_3) \cdot nH_2O \quad (2)$$

$$Mg_xCa_y(CO_3)_{2x+2y/2} \cdot nH_2O \quad (3)$$

$$M_xSi_y(OH)_{2x+4y} \cdot nH_2O \quad (4)$$

$$M_xAl_ySi_z(OH)_{2x+3y+4z} \cdot nH_2O \quad (5)$$

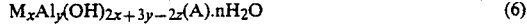
$$M_xAl_y(OH)_{2x+3y-2z}(A) \cdot nH_2O \quad (6)$$

where M represents Mg or Ca; A represents $CO_3$, $HPO_4$ or $SO_4$; x, y and z represent a positive number; and n represents zero or a positive integer; as well as calcined products and hydrates thereof.

2. A method for deodorizing off-odor polypropylenes which comprises incorporating 0.005 to 0.1% by weight of at least one deodorizer compound in said off-odor polypropylenes
   (a) said off-odor polypropylenes comprising olefins polymerized with a Ziegler-type catalyst and treated with an alkylene oxide to deactivate the Ziegler-type catalyst at the end of the polymerization, and containing zero active chlorine,
   (b) said deodorizer compound being selected from the group consisting of $Al_xSi_y(OH)_{3x+4y}\cdot nH_2O$ (1)

$Mg_x(OH)_{2y-2x}(CO_3)_y\cdot nH_2O$ (2)

$Mg_xCa_y(CO_3)_{2x+2y/2}\cdot nH_2O$ (3)

$M_xSi_y(OH)_{2x+4y}\cdot nH_2O$ (4)

$M_xAl_ySi_z(OH)_{2x+3y+4z}\cdot nH_2O$ (5)

$M_xAl_y(OH)_{2x+3y-2z}(A)\cdot nH_2O$ (6)

where M represents Mg or Ca; A represents $CO_3$, $HPO_4$ or $SO_4$; x, y and z represent a positive number; and n represents zero or a positive integer; as well as calcined products and hydrates thereof.

3. A method according to claim 2 wherein said deodorizer compound is $Al_xSi_y(OH)_{3x+4y}\cdot nH_2O$.

4. A method according to claim 2 wherein said deodorizer compound is $Mg_x(OH)_{2y-2x}(CO_3)_y\cdot nH_2O$.

5. A method according to claim 2 wherein said deodorizer compound is $Mg_xCa_y(CO_3)_{2x+2y/2}\cdot nH_2O$.

6. A method according to claim 2 wherein said deodorizer compound is $M_xSi_y(OH)_{2x+4y}\cdot nH_2O$.

7. A method according to claim 2 wherein said deodorizer compound is $M_xAl_ySi_z(OH)_{2x+3y+4z}\cdot nH_2O$.

8. A method according to claim 2 wherein said deodorizer compound is $M_xAl_y(OH)_{2x+3y-2z}(A)\cdot nH_2O$.

* * * * *